United States Patent
Colotte et al.

(10) Patent No.: US 8,328,500 B2
(45) Date of Patent: Dec. 11, 2012

(54) SYSTEM FOR CONTROLLING VARIABLE-GEOMETRY EQUIPMENTS OF A TURBOMACHINE, PARTICULARLY BY ARTICULATED BELLCRANKS

(75) Inventors: Baptiste Benoit Colotte, Melun (FR); Bruno Robert Gaully, Marolles en Hurepoix (FR)

(73) Assignee: SNECMA, Paris (FR)

( * ) Notice: Subject to any disclaimer, the term of this patent is extended or adjusted under 35 U.S.C. 154(b) by 603 days.

(21) Appl. No.: 12/566,400

(22) Filed: Sep. 24, 2009

(65) Prior Publication Data

US 2010/0080684 A1 Apr. 1, 2010

(30) Foreign Application Priority Data

Sep. 30, 2008 (FR) ..................... 08 56566

(51) Int. Cl.
 *F04D 29/56* (2006.01)
(52) U.S. Cl. ....... 415/36; 415/149.4; 415/165; 415/191; 415/211.2; 416/47; 416/104; 416/168 R
(58) Field of Classification Search .................. 415/36, 415/40, 42, 149.1, 149.2, 149.4, 150, 153.2, 415/165, 191, 211.2; 416/44, 45, 46, 47, 416/103–107, 154, 166
See application file for complete search history.

(56) References Cited

U.S. PATENT DOCUMENTS

| | | | | |
|---|---|---|---|---|
| 4,461,145 A | * | 7/1984 | Stephens | 60/226.3 |
| 4,569,199 A | * | 2/1986 | Klees et al. | 60/226.1 |
| 5,259,187 A | * | 11/1993 | Dunbar et al. | 60/204 |
| 7,444,802 B2 | * | 11/2008 | Parry | 415/160 |
| 7,594,403 B2 | * | 9/2009 | Cadieux | 60/785 |

FOREIGN PATENT DOCUMENTS

| | | |
|---|---|---|
| EP | 1 398 464 A2 | 3/2004 |
| EP | 1 724 472 A2 | 11/2006 |
| FR | 2 445 439 | 7/1980 |
| FR | 2 633 046 | 12/1989 |
| WO | WO 2007/116319 A2 | 10/2007 |

OTHER PUBLICATIONS

U.S. Appl. No. 13/121,726, filed Mar. 30, 2011, Colotte, et al.
U.S. Appl. No. 13/121,752, filed Mar. 30, 2011, Colotte, et al.
U.S. Appl. No. 13/121,706, filed Mar. 30, 2011, Colotte, et al.
U.S. Appl. No. 13/379,869, filed Dec. 21, 2011, Gaully, et al.
U.S. Appl. No. 12/566,325, filed Sep. 24, 2009, B. Colotte, et al.
U.S. Appl. No. 12/566,211, filed Sep. 24, 2009, B. Colotte, et al.

\* cited by examiner

*Primary Examiner* — Igor Kershteyn
(74) *Attorney, Agent, or Firm* — Oblon, Spivak, McClelland, Maier & Neustadt, L.L.P.

(57) ABSTRACT

A system for controlling at least two variable-geometry equipments of a turbomachine, in which the first equipment is a variable pitch stator blade stage of a compressor of a first core moving between a closed position at idle speed and an open position at high speed, and the second equipment is at least one bleed valve of a compressor of a second core moving between an open position at idle speed and a closed position at high speed, is disclosed. The actuator operates over a portion of its travel a first branch of an angle transmission member which actuates the first equipment and leaves this branch at rest on an abutment over the rest of its travel. The actuator operates the second equipment via a sliding junction member arranging a free travel in the actuation of said second equipment.

12 Claims, 7 Drawing Sheets

SYSTEM FOR CONTROLLING VARIABLE-GEOMETRY EQUIPMENTS OF A TURBOMACHINE, PARTICULARLY BY ARTICULATED BELLCRANKS

BACKGROUND OF THE INVENTION

The present invention relates to the general field of the control of variable-geometry equipments of a turbomachine. The invention more particularly relates to the optimization of the control of several equipments forming part of distinct cores of the turbomachine.

"Variable-geometry equipment" means in this instance an equipment that is connected to a control member and of which the dimension, the shape, the position and/or the speed is or are capable of being modified, according to detected events or defined parameters, in order to act on the operation of the turbomachine. Examples of variable-geometry equipments are air bleed valves of the compressor (with variable aperture), fixed blades of a variable-pitch high-pressure compressor, turbine blades of which the clearance at the tip is variable, variable flow-rate fuel pumps, etc.

"Core" conventionally designates a subassembly of a turbomachine comprising as main members a compressor and a turbine assembled on a single shaft. Typically, a turbomachine may comprise a high-pressure core and a low-pressure core. Each core comprises a compressor and a turbine, the blades of which are rotated about the axis of the shaft onto which they are mounted.

DESCRIPTION OF THE PRIOR ART

Usually, the various cores of a turbomachine are designed to be able to operate independently of one another. Their rotation speeds are independent, even though they can be connected or correlated in certain operating regimes.

Also usually, because of this independence between the various cores of a turbomachine, in order to control variable-geometry equipments forming part of different cores, distinct control systems are provided for these distinct equipments. For this reason, controlling two variable-geometry equipments of two distinct cores generally requires two control circuits, two actuators, two power sources, etc. The result of this is that the weight, the cost and the space requirement of such a control system for the equipments are relatively high. Such a configuration is the one adopted in the European patent application of the applicant published under number EP 1 724 474.

For example, the low-pressure stage may comprise one or more air bleed valves (often designated VBV which is the acronym for "Variable Bleed Valve"), while the high-pressure stage may comprise one or more variable pitch stator blade stages (often called VSV, which is the acronym for "Variable Stator Vanes"). In order to reduce the weight of these equipments and their control members, it can be envisaged to install no VBV. Although the saving thus made is significant (the actuators, the servovalves, the pipework, the harnesses, etc. that are associated thereby are removed), the risks induced are considerable, particularly at idle speed if water or hail enters the engine causing an increased risk of stopping the latter.

Patent application FR 2 445 439 by the General Electric Company describes a single means for controlling air bleed valves of a low-pressure stage and of the variable pitch stator stages of a high-pressure stage, but this means controls both equipments in an essentially sequential manner, only the stator blades being actuated during normal operation of the turbomachine (that is to say above the idle speed).

SUMMARY OF THE INVENTION

The object of the invention is to propose a turbomachine with variable-geometry equipments belonging to the different cores of the turbomachine and a control system for these equipments that is optimized.

Thus, the invention relates to a system for controlling at least two variable-geometry equipments of a turbomachine, the turbomachine comprising at least a first core rotating at a first speed and a second core rotating at a second speed, the first equipment being a variable pitch stator blade stage of a compressor of the first core traveling between a closed position at idle speed and an open position at high speed, the second equipment being at least one bleed valve of a compressor of the second core traveling between an open position at idle speed and a closed position at high speed, said system comprising an actuator which actuates both equipments.

By using a single actuator for controlling several (at least two) variable-geometry equipments, the control system makes it possible to reduce the number of parts of the turbomachine and thereby achieve the objective of the invention. The weight, the volume and the cost of a second control system are, at least largely, avoided, since the equipments of the first and second cores are actuated by the same actuator.

According to one embodiment, the control system is capable of controlling more than two variable-geometry equipments with the aid of a single actuator.

According to one embodiment, a variable-geometry equipment is common to several cores of the turbomachine.

According to one embodiment, since the first core is driven at a controllable rotation speed, the actuator is controlled by the rotation speed of the first core.

Therefore, the equipment of the second core is controlled by the rotation speed of the first core, through the actuator.

According to a particular embodiment, the first core is a high-pressure core and the second core a low-pressure core.

In particular, since the turbomachine comprises a low-pressure compressor and a high-pressure compressor, the variable-geometry equipment of the low-pressure compressor is controlled by the rotation speed of the high-pressure compressor.

According to one embodiment, in the case of a turbomachine with a high-pressure core and a low-pressure core, the variable-geometry equipments of the high-pressure core are situated close to the low-pressure core (for example close to the upstream side of the high-pressure core).

According to a particular embodiment in this case, the turbomachine is a dual-core turbomachine, with a high-pressure core and a low-pressure core. Preferably in this case, the variable pitch stator blade stage or stages forms or form part of the high-pressure core, the first equipment controlled by the control system forming part of the low-pressure core of the turbomachine.

According to a particular embodiment in this case, the blade stage comprises a plurality of blades, each mounted so as to pivot on a casing of the turbomachine, and a control ring surrounding the casing is connected to each of the stage blades via levers, the actuator being capable of rotating the stage control ring by means of a leader member mounted on the casing.

According to one embodiment, a variable-geometry equipment is an air bleed valve of the turbomachine. This equipment may comprise one air bleed valve or a plurality of air bleed valves. This is, for example, an air bleed valve of the VBV type at the low-pressure compressor.

The control system of the invention may be adapted to control various types of equipment. In addition to those explained above, the variable-geometry equipments may notably comprise or form an element of one or more of the following devices:

- an air bleed valve of the high-pressure compressor with proportional aperture (often called "Transient Bleed Valve" (TBV) or "Start Bleed Valve" (SBV));
- an on/off high-pressure compressor air bleed valve (often called "Handling Bleed Valve" (HBV));
- an air flow regulation valve contributing to the control of clearance in a low-pressure turbine (often called "Low Pressure Turbine Active Clearance Control" (LP-TACC)), or in a high-pressure turbine (often called "High Pressure Turbine Active Clearance Control" (HP-TACC)).

According to one embodiment, in the control system, the actuator comprises a moveable control member the movements of which transmit the control to the variable-geometry equipments. The control member may, for example, comprise the arm of a cylinder.

According to one embodiment, the actuator is arranged to actuate the first variable-geometry equipment by varying a parameter in a range of actuation of the first equipment, the actuator being arranged to actuate the second variable-geometry equipment by varying the same parameter in a range of actuation of the second equipment.

The parameter of the actuator indicated above may, for example, be the position of the member for actuating the actuator. Therefore, this parameter may be the position of the end of the arm of a cylinder. Therefore, in this case, varying this parameter means moving the end of the cylinder arm or the position of the operating end of the actuator.

According to one embodiment, the actuator drives an angle-transmission member comprising at least two branches and mounted in a movable manner on the casing of the turbomachine, a first branch driving the first equipment and a second branch driving the second equipment.

According to a particular embodiment, the two branches are articulated and connected to one another via a first elastic return means.

According to a particular embodiment, the first branch is rotated on a portion of the travel of said actuator by said elastic return means and remains at rest by contact with an abutment on the rest of its travel.

According to a particular embodiment, the actuator drives the second equipment via a sliding junction member arranging a free travel in the actuation of said second equipment.

When the actuation parameter varies in a range situated outside the range of actuation of an equipment, the latter is not actuated by the actuator. Such a range of values of the parameter of the actuator, in which no action is effectively applied to the equipment in question, forms for said equipment a "free travel". In such a range, irrespective of the variations of the parameter, the actuator does not (or not significantly) act on the equipment in question.

According to a particular embodiment, the sliding junction member comprises a first control member supporting a rod that can move in an oblong hole made in a second control member.

According to a particular embodiment, the control member is returned by an elastic means to the position corresponding to interaction between the first branch and the abutment.

According to a particular embodiment, the control member is returned by an elastic means to the position corresponding to the absence of interaction between the first branch and the abutment.

According to a particular embodiment, at least one portion of the range of actuation of the first equipment is outside the range of actuation of the second equipment.

Control by a single actuator of two variable-geometry equipments may be made easier by the fact that the ranges of actuation of both equipments do not match totally, making it possible, outside the common zone, to actuate only one equipment.

According to another particular embodiment, the ranges of actuation of the first and second equipments are not connected, that is to say that the range of actuation of the first equipment is entirely outside the range of actuation of the second equipment (the ranges do not intersect).

Therefore, the equipments may be actuated in a sequential manner. Specifically, when the parameter of the actuator in the range of actuation of the first equipment is varied, these variations do not substantially induce any movement or any consequence on the second equipment, and vice versa.

According to a particular embodiment, the range of actuation of one of the first and second equipments is entirely contained in the range of actuation of the other equipment.

In this case, the equipments are actuated simultaneously in their common zone, which may have advantages depending on the nature of the equipment. Such an embodiment may make it possible to provide a greater amplitude of actuation.

According to a particular embodiment in this case, the range of actuation of one of the equipments has a much smaller amplitude than the total amplitude of the range of actuation of the other equipment; for example, it may represent less than 20% or less than 10% of this range. Accordingly, when the range of the equipment with the reduced range of actuation is included in the range of the other equipment, the actions for controlling the equipment cause only a slight and/or not very significant variation in the control of the other equipment. This arrangement makes the control of two equipments easier with a single control system.

The control system is preferably arranged so that the variations of the parameter of the actuator between the limits of its range of actuation are sufficient to actuate the equipments with sufficient amplitude.

According to one embodiment, the connection between the actuator and one of the equipments comprises a disengagement device, capable of disengaging the drive of this equipment by the actuator over a range of values of the actuation parameter. This range of values is therefore situated outside the range of actuation of the equipment in question. Therefore, the disengagement device makes it possible to set aside a space in the range of actuation purely for controlling the other item(s) of equipment. This may be essential when the equipment in question must not be affected even when the control of one of the other items of controlled equipment varies.

According to one embodiment, the control system also comprises return means keeping a control member of one of the equipments in a predetermined position, at least when the parameter of the actuator varies in a space situated outside the range of actuation of the equipment.

The invention also relates to a turbomachine fitted with the control system explained above.

BRIEF DESCRIPTION OF THE DRAWINGS

The invention will be better understood with the aid of the following description of the preferred embodiment of the turbomachine and of the system of the invention, with reference to the appended drawings, in which.

DESCRIPTION OF THE PREFERRED EMBODIMENTS

Figure 1:
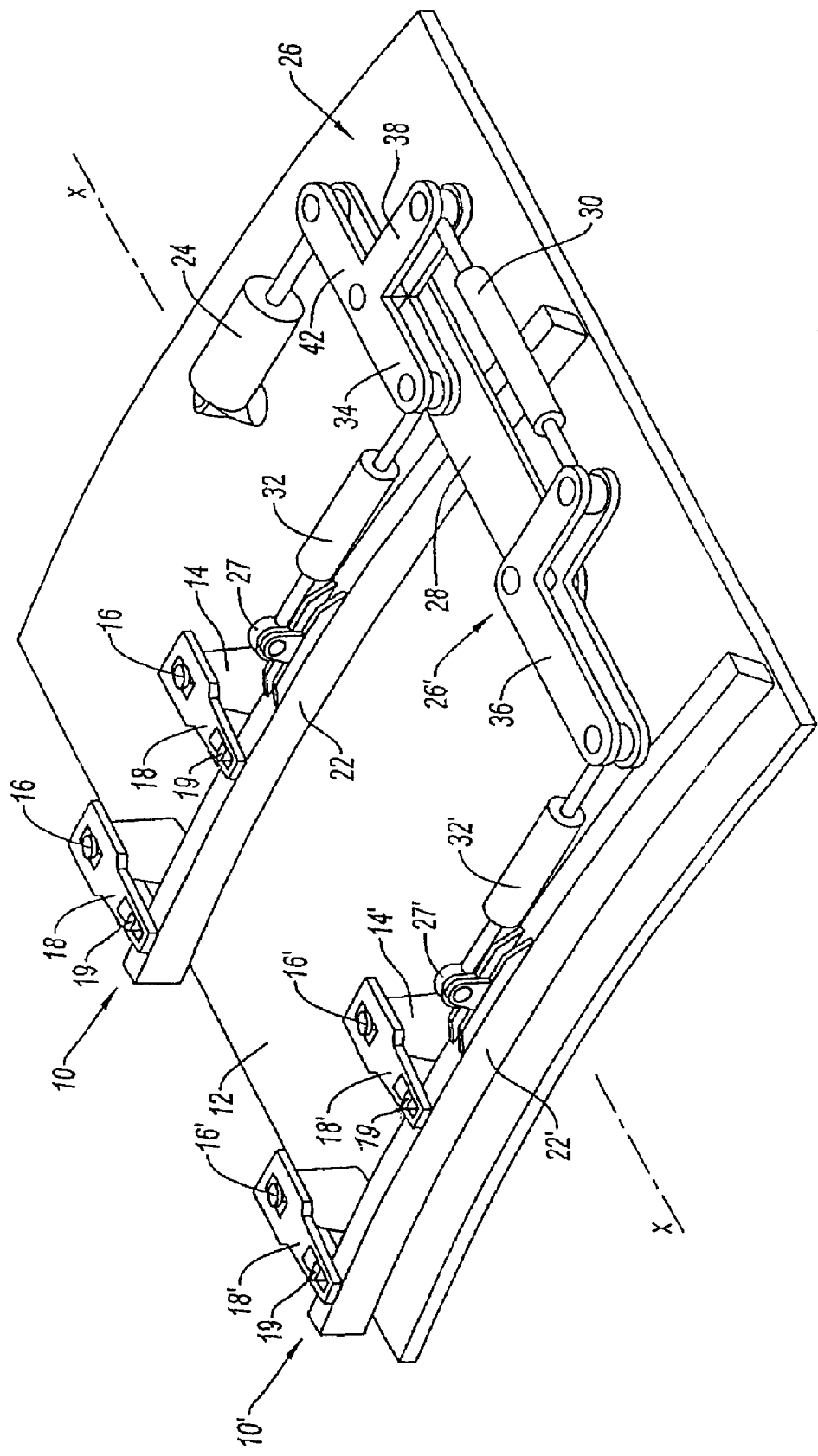
FIG. 1 represents a view in perspective of a system for controlling the position of variable pitch blades according to the prior art.

In a known manner, a turbomachine, in this instance with an X-X axis, comprises, from upstream to downstream, a fan, a low-pressure compressor (frequently called a "booster" by those skilled in the art), a high-pressure compressor, a combustion chamber, a high-pressure turbine, a low-pressure turbine and a nozzle for exhausting the gases (not shown).

The high-pressure compressor and the turbine are attached to a single shaft, called the high-pressure shaft, and therefore belong to the high-pressure core of the turbomachine, while the low-pressure compressor and the turbine are attached to a single shaft, called the low-pressure shaft, and therefore belong to the low-pressure core of the turbomachine.

Hereinafter, the following abbreviations will be used: LP for low pressure and HP for high pressure.

The HP compressor comprises at least one stage formed of a disk of movable blades and a disk of fixed blades (also called stator blades). Each stage is formed of a plurality of blades placed radially about the axis X-X of the turbomachine. In this instance, the HP compressor comprises a plurality of stages, with an alternation of movable blade disks and fixed blade disks. The blades are enveloped by a cylindrical casing 12 which is centered on the axis X-X of the turbomachine.

Of the fixed blade disks, at least one stage 10 comprises blades 14 called variable-pitch blades. Each blade 14 is mounted so as to pivot about an axis 16 (or pivot) which traverses the casing 12. The angular position of each blade 14 may be adjusted by rotating its pivot 16.

The stage 10 of variable pitch blades forms a first variable-geometry equipment belonging to the HP core (since it belongs to the HP compressor). The variable parameter of this equipment is the angle of the blades 14; in this instance, all the blades 14 are simultaneously rotated, thanks to a control ring 22 of the stage 10 of blades 14.

The control ring 22 is of generally circular shape; it surrounds the casing 12 and is centered on the axis X-X of the turbomachine. The synchronized modification of the angular position of the blades 14 is therefore obtained by rotating the control ring 22 about the axis X-X of the turbomachine, in a known manner.

The turbomachine comprises a second variable-geometry equipment 110. In this incidence it is an air bleed valve of the VBV type (here represented in a schematic manner). The variable parameter of this equipment 110 is the angle of aperture of the bleed valve 110. This equipment 110 belongs to the LP core of the turbomachine. The function of the VBV valve 110 is to bleed air to the outlet of the LP compressor in order to reduce the risks of malfunction of this compressor when it operates in particular conditions.

Naturally, in a known manner, the second equipment 110 could comprise a plurality of such valves.

The control system is arranged in order to control the rotation of the control ring 22 of the stage 10 of variable pitch blades (the first equipment 10) and the movement of a control member 115 of the second equipment 110.

Accordingly, the control system comprises an actuator 24, in this instance a cylinder 24, which is mechanically connected to the first equipment 10 and to the second equipment 110 in order to move them. A single actuator 24 therefore controls two variable-geometry equipments 10, 110 of two separate cores.

Accordingly, each pivot 16 of the variable pitch blades 14 is connected to one end of a control link rod 18 or lever 18 the other end of which is articulated about a trunnion 19 attached to the control ring 22 and extending radially relative to it.

The ring 22 comprises at least one yoke 27 to which is attached one end of a control link rod 32, of the stretching screw type, which extends substantially tangentially to the ring 22. The other end of the control link rod 32 is secured to an angle transmission member 26 called the leader (because it is directly connected to the actuator 24), mounted so as to pivot on a housing 28 of the casing 12 of the turbomachine. The leader angle transmission member 26, illustrated in the shape of a T in FIG. 1, is made in two articulated parts connected to one another by a first elastic means 61 in the first and second embodiments. The leader angle transmission member 26, or the two articulated parts that form it, is mounted so as to pivot about a shaft 50 mounted on the casing 12, extending to the intersection of the branches of the T. The control link rod 32 is attached to one end of a first branch 34 of the angle transmission member, the end of the rod of the cylinder 24 being attached, in an articulated manner, to the end of a second branch 42 which is substantially in the extension of the first branch 34.

The actuator (cylinder) 24 can rotate the control ring 22 of the stage 10 of variable pitch blades via the leader angle transmission member 26 which transmits the movement of the cylinder 24 to the control link rod 32 which in turn transmits the movement to the ring 22 to which it is attached in translation (curvilinear).

The leader angle transmission member 26 and the link rod 32 are the main elements of the chain for transmitting movement from the actuator (cylinder 24) to the control ring 22.

The cylinder 24 is controlled by an electronic control unit. Its movements depend on the speed N2 of rotation of the HP compressor.

The invention has been represented with a single stage of variable pitch blades, but it can naturally be applied with a plurality of stages, the stages being connected in conventional manner to a first angle transmission member 26, called the leader angle transmission member, and to angle transmission members 26', called follower angle transmission members, which are operated by a synchronization bar 30.

The control system also controls the movement of a control member 115 for controlling the second equipment 110, with the aid of a specific device.

Figure 2:
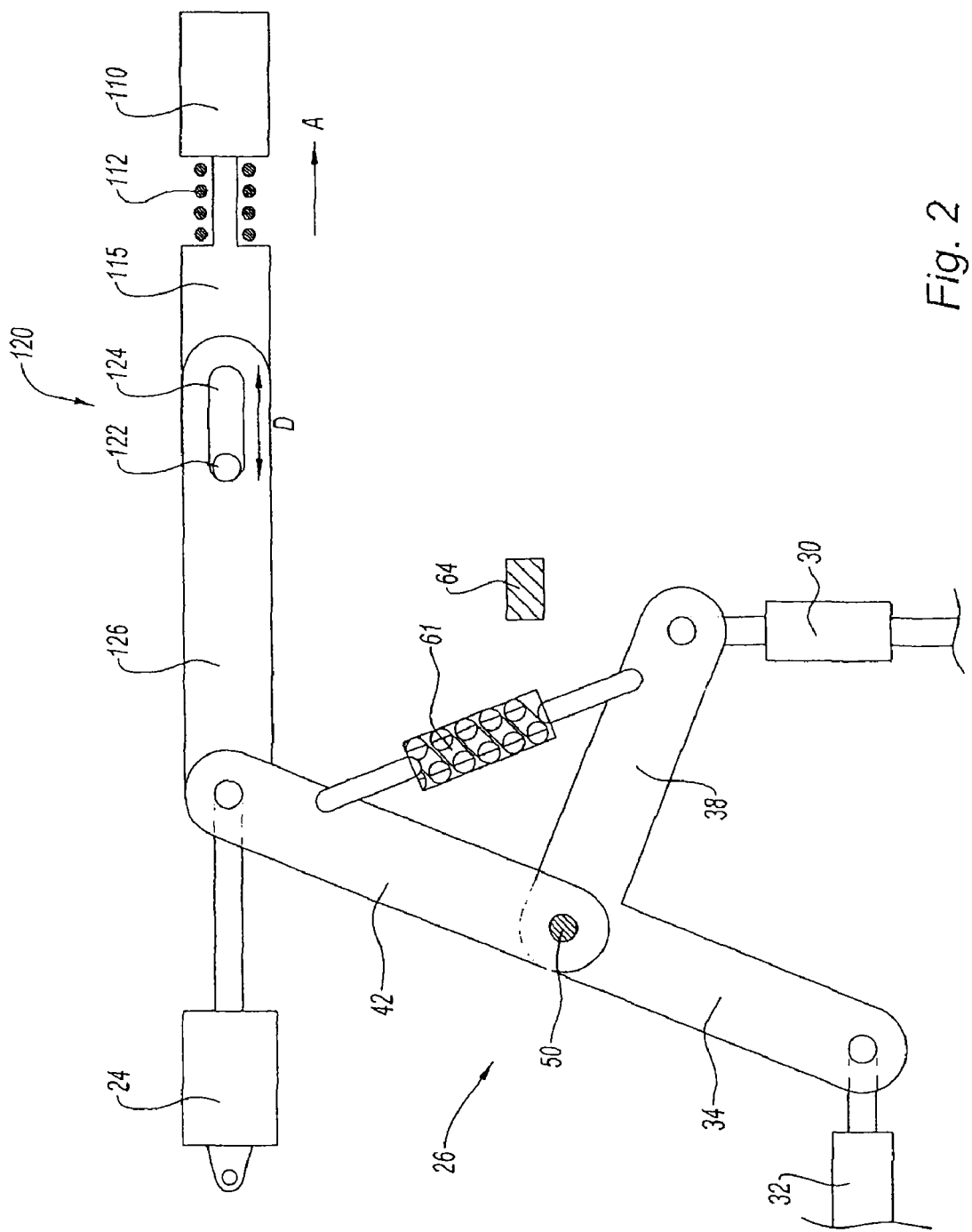
FIG. 2 is a schematic view of a device for controlling the position of the bleed valves of a compressor based on the control of the position of the blades of a variable pitch stator, according to a first embodiment of the invention; it represents this device in the position corresponding to a high engine rotation speed (stator blades open and bleed valves closed)
Figure 3:
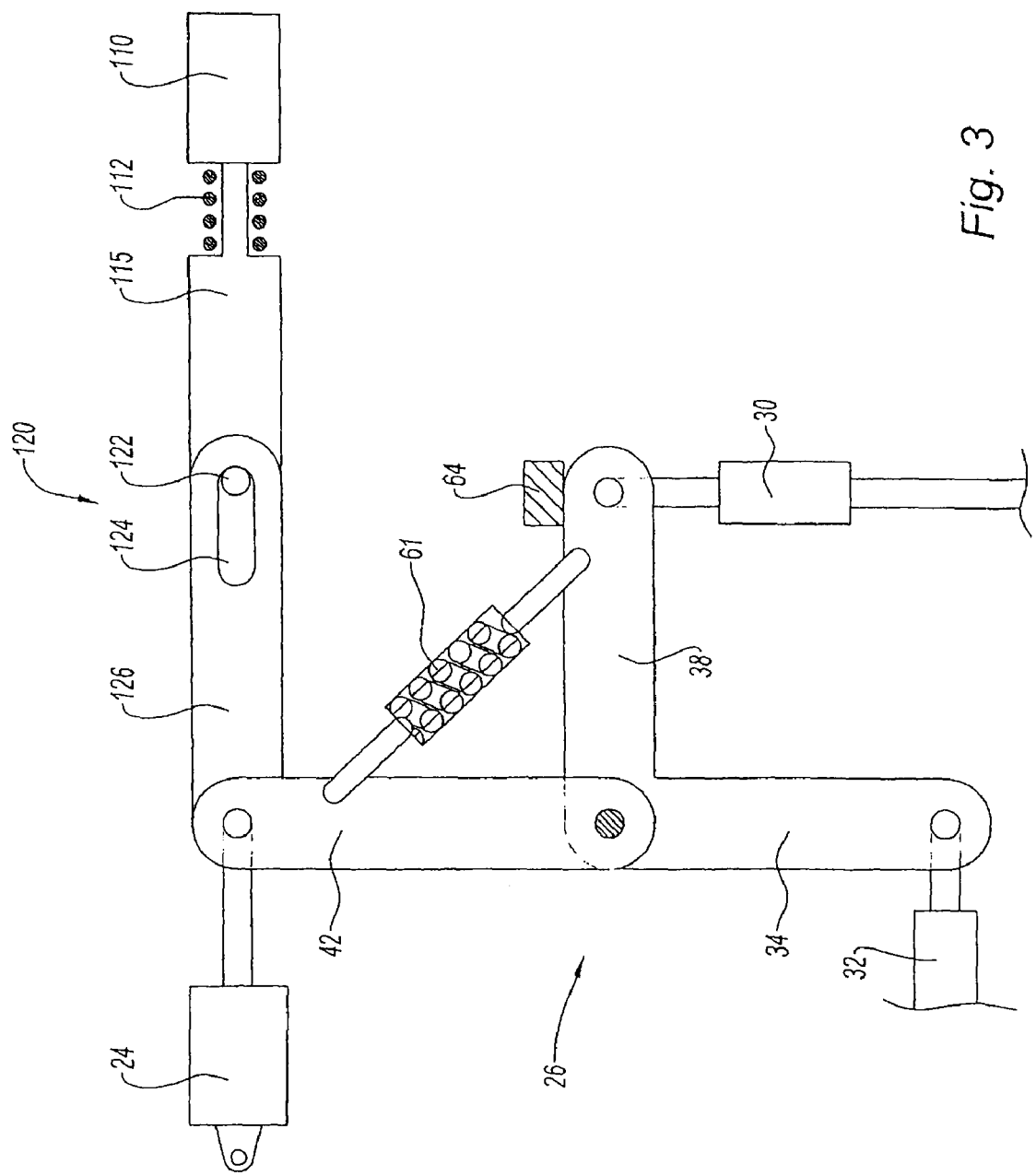
FIG. 3 is a schematic view of the same device in a position corresponding to an intermediate engine rotation speed, the stator blades being in the process of closing and the bleed valves still being closed.
Figure 4:
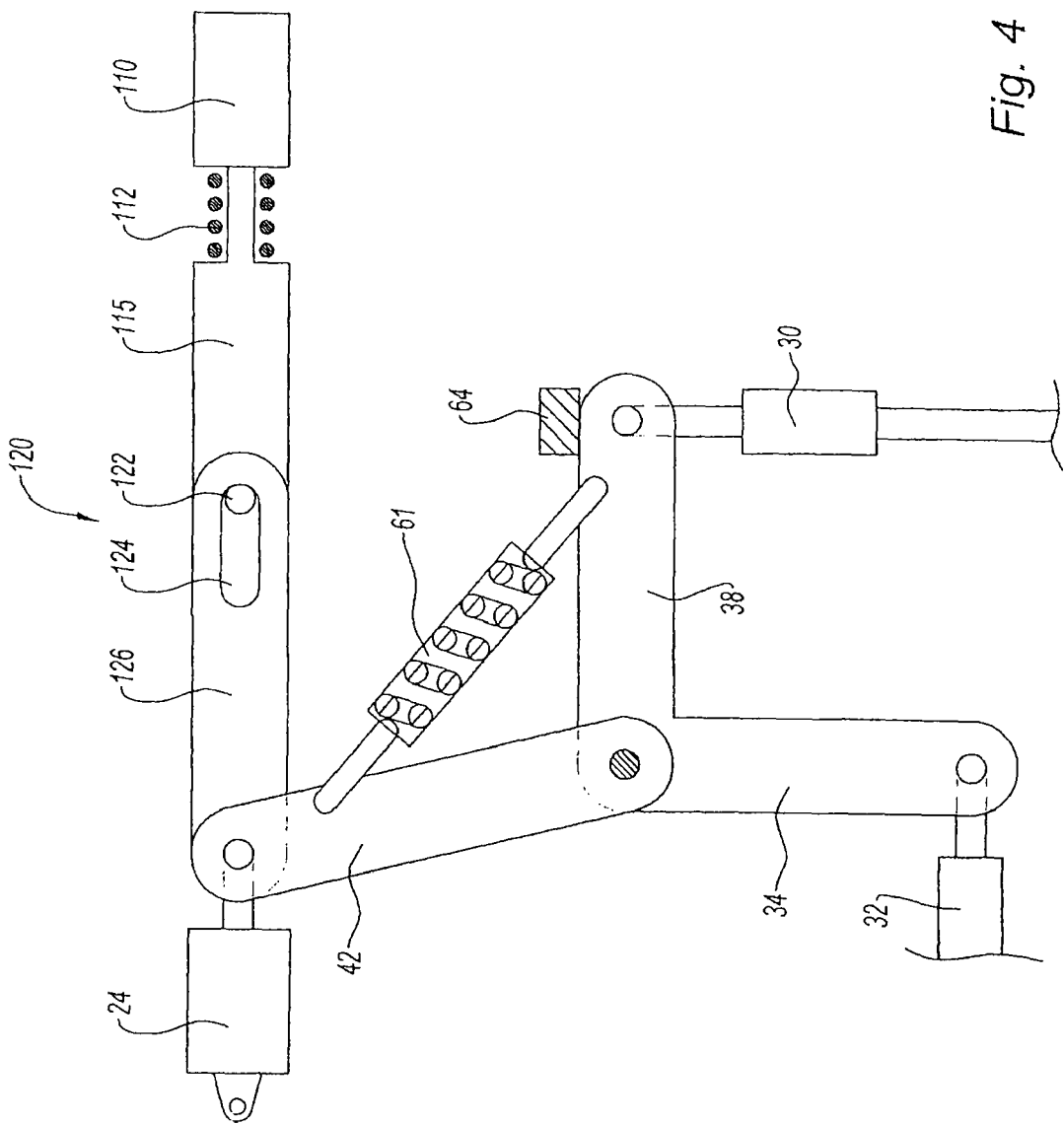
FIG. 4 is a schematic view of the same device in a position corresponding to a low engine rotation speed, the stator blades being closed and the bleed valves open.

With reference now to FIGS. 2 to 4, they show a device for actuating the bleed valves with the aid of the system for controlling the variable pitch stator blades, according to a first embodiment. The angle transmission member 26 is made in two portions, the first portion comprising a first branch 34 which can rotate about the shaft 50 in order to generate the movement of the link rod 32, and the second portion consisting of a second branch 42, positioned substantially in line with the first branch and on which the force generated by the actuator 24 is exerted. The first portion also comprises a third branch 38, rigidly connected and substantially perpendicular to the first branch 34. The two branches 38 and 42 are coupled to one another via a first return spring 61 which tends to bring the two branches closer together and to close the angle that they make with one another.

In the situation in which the system actuates several control rings 22, 22', etc., the third branch 38 operates the synchronization bar 30 connected to a link rod 32' for actuating the control ring 22'.

The actuator 24, at the same time as it acts on the terminal portion of the second branch 42, is connected, substantially in its axis of extension, to the mid-portion of a yoke, or U-shaped part 126. The two branches of the yoke 126 pass on either side of a control member 115 of the variable geometry 110, which controls the movements of the second variable-geometry equipment 110 in the direction indicated by the arrow A. The two branches of the yoke 126, forming a second member for controlling the second equipment 110, are shown as rectangular plates each pierced by an oblong hole 124. The first control member 115 supports a rod 122 which passes through the oblong holes 124 in which it slides. A second return spring 112 is positioned between the control member 115 and the second item of controlled equipment 110, and tends to keep the bleed valves closed.

The yoke 126 and the rod 122 sliding in the elongated hole 124 form the sliding junction member 120. The actuator 24 operates the second equipment 110 via this sliding junction member 120, the sliding of which defines a free travel. Specifically, while the rod 122 moves inside the elongated hole 124 without being blocked at one end of the latter, this causes no movement of the control member 115, in other words the movements of the actuator (the cylinder 24) cause no movement of the control member 115 of the equipment 110.

Figure 5:
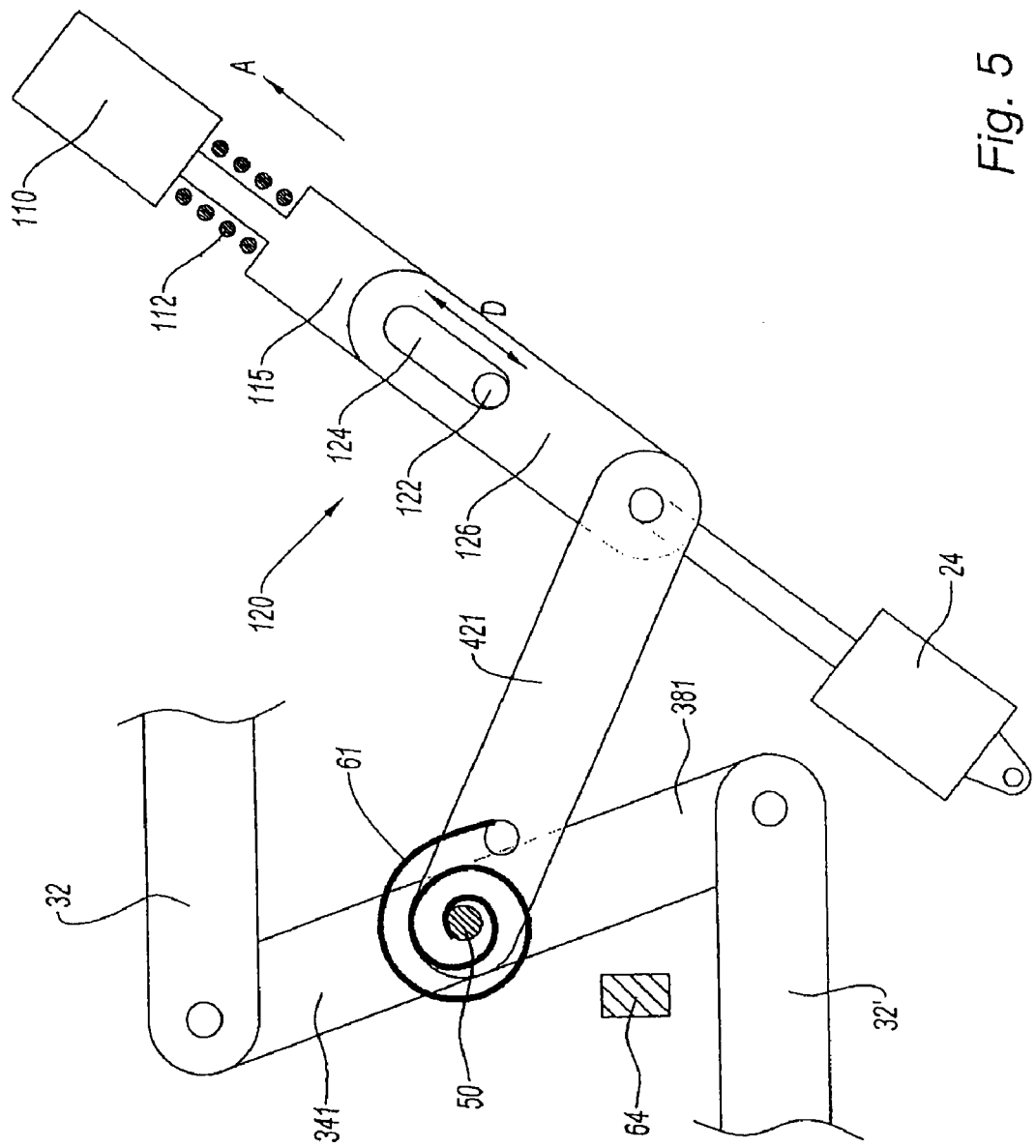
FIGS. 5 and 6 are schematic views of a device for controlling the position of the bleed valves of a compressor based on controlling the position of the blades of a variable pitch stator, according to a second embodiment of the invention; they represent this device respectively in the initial position, that is to say corresponding to a high engine rotation speed (stator blades open and bleed valves closed) and in the final position, that is to say corresponding to a low engine rotation speed (stator blades closed and bleed valves open)
Figure 6:
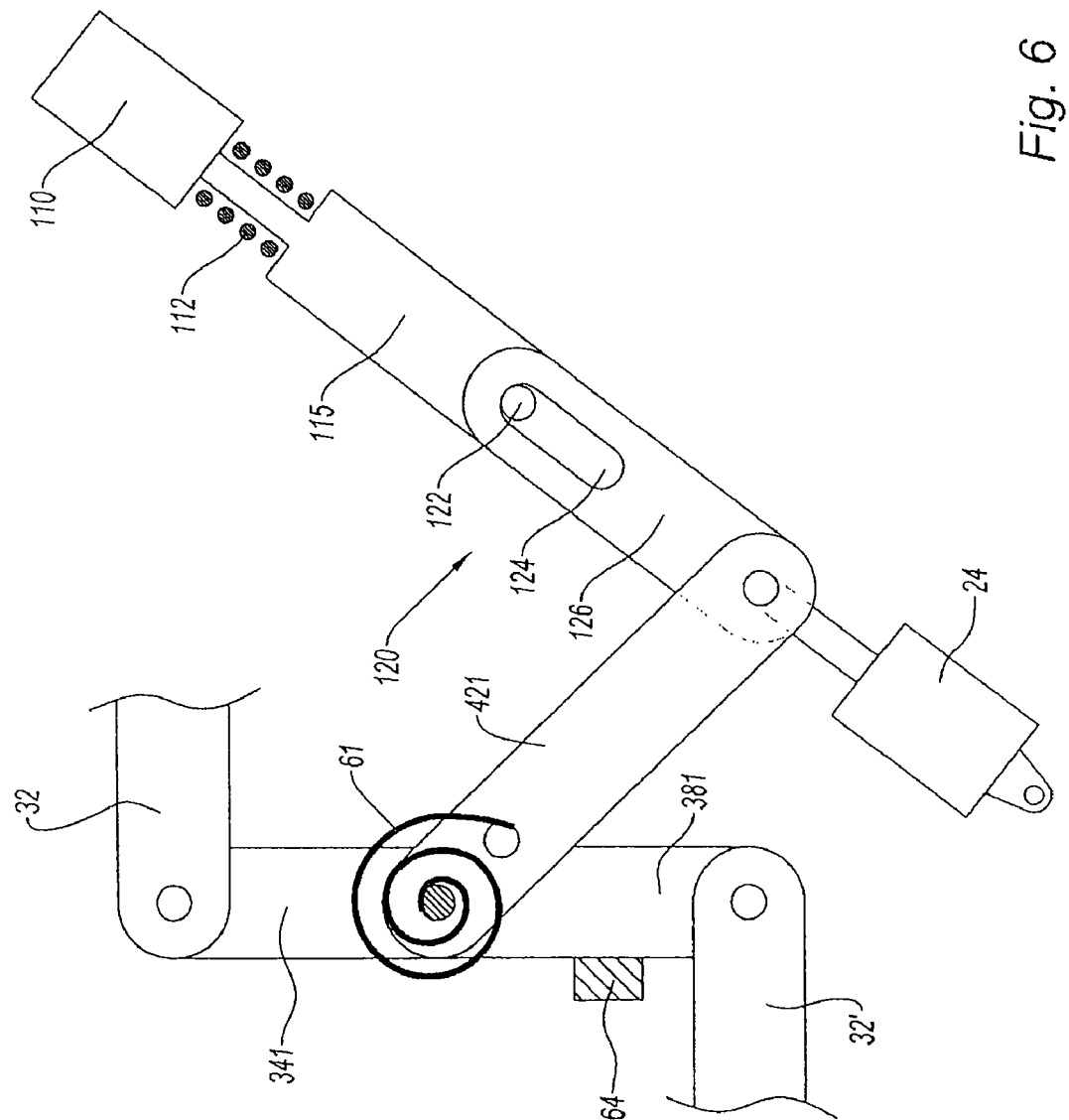

With reference now to FIGS. 5 and 6, they show a second embodiment, similar to the first; the parts that have the same function as in the first embodiment are referenced by adding the FIG. 1 to the right of the reference number of the part in the first embodiment. In this configuration, the two branches 341 and 381 are aligned and the second branch 421 is not oriented in the axis of the first branch 341. Unlike the first embodiment, the first return spring 61 tends to separate the two branches from one another and opposes the alignment of the second branch 421 on the third branch 381 when the cylinder is in the retracted position.

Figure 7:
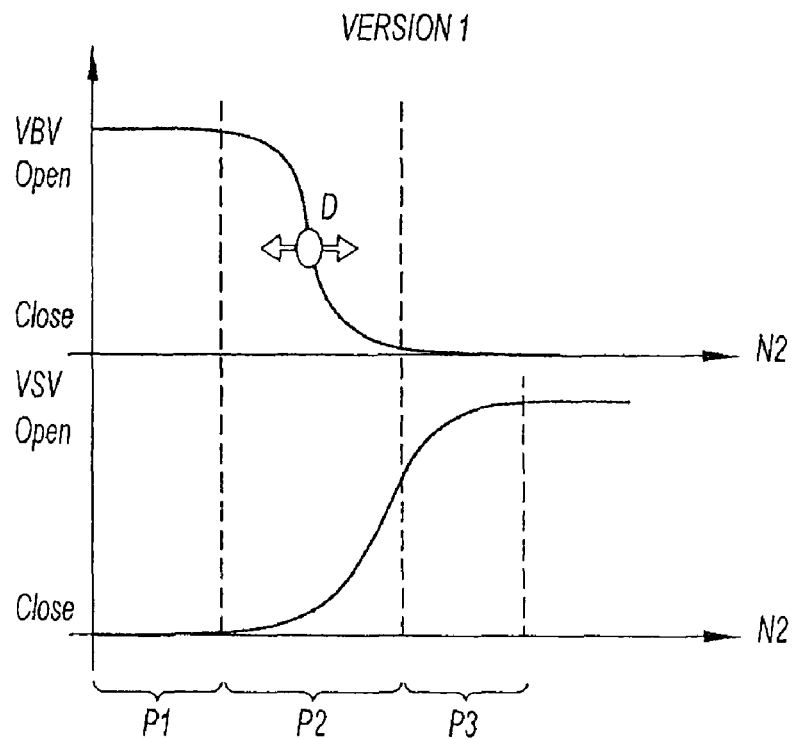
FIGS. 7 and 8 are curves giving the position of the stator blades and of the bleed valves depending on the engine speed, in the case of an overlap and in the case of an absence of overlap of the ranges of aperture and closure of the two equipments.
Figure 8:
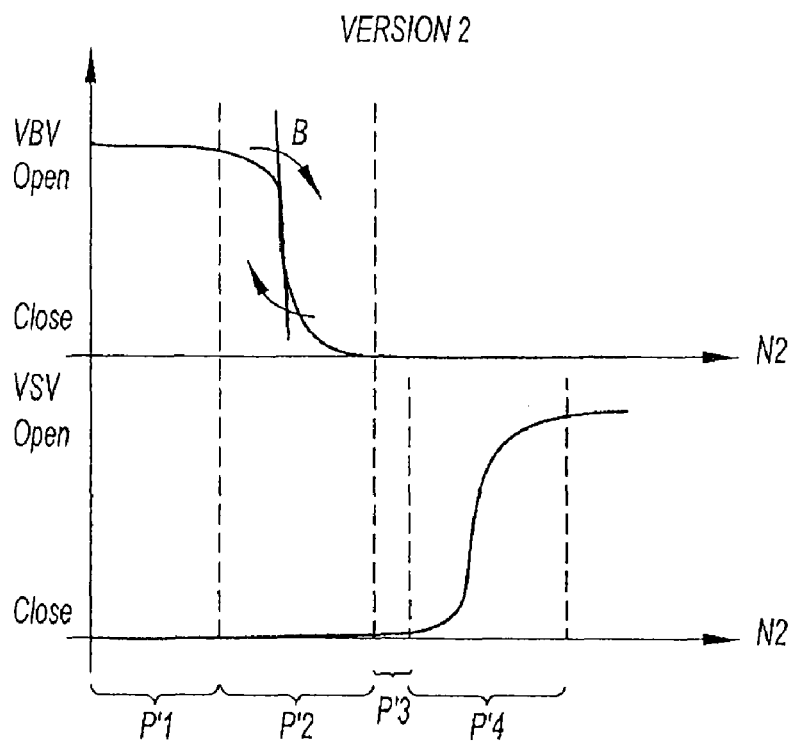

With reference to FIGS. 7 and 8, they show the opening laws of the variable pitch blades (referenced VSV) and of the bleed valves (referenced VBV) according to the rotation speed N2 of the HP core. The higher the value of the curve, the more open is the corresponding variable-geometry equipment 10b, 110. The open position of the VSV blades 14 corresponds to the position in which they allow the largest air flow to pass into the HP compressor 3; the open position of the VBV valves 110 corresponds to the position in which they take the maximum air flow rate from the LP compressor.

In a first phase P1, at low speed, the VBV bleed valves 110 are open while the VSV variable pitch blades 14 are closed. In a second phase P2, at intermediate speed, the VBV valves 110 are progressively closed as the speed N2 of the HP core increases while the VSV blades 14 are progressively opened as the speed N2 of the HP core increases; at the end of the second phase P2, the VBV valves 110 are almost completely closed while the VSV blades 14 are approximately two-thirds open. In a third phase P3, the closing of the VBV valves 110 is completed while the opening of the VSV blades 14 is progressively completed, as the speed N2 of the HP core increases.

Therefore, the two variable-geometry equipments are operated by the speed of the HP core. In particular, the VBV valves 110, belonging to the LP core, are controlled by the rotation speed N2 of the HP core. The result of this is a simplification of the definition of the laws of opening and a guaranteed good synchronization between the openings and closures of the variable-geometry equipments, since these openings and closures depend on the same single parameter: the rotation speed N2 of the HP core.

In version V1 represented in FIG. 7, the closure of the VSV variable pitch blades begins at the same time as the opening of the VBV bleed valves but ends after, whereas, in version V2, shown by FIG. 8, it begins only after their opening. The choice of a version, and the precise moment at which the closure of the bleed valves begins, are defined by changing the position and the length D of the oblong hole 124. Lengthening this aperture delays the beginning of opening of the bleed valves, while shortening it brings forward said opening.

By taking as a support the first embodiment, FIGS. 2 to 4 illustrate the movement of the control system in three positions corresponding to a maximum, intermediate and minimum extension of the cylinder 24. The operation of the invention in the second embodiment is similar.

In the control system 1, the extension of the cylinder 24 is the parameter of actuation of this actuator.

FIG. 2 represents for example the beginning of an action on the equipments. In this initial situation, the cylinder is in the maximum extension position; the variable pitch blades 14 are in the open position and the bleed valves 110 in the closed position.

From this position, the actuation of the cylinder 24, in response to a reduction in the rotation speed of the engine, causes a rotation of the second portion of the leader angle transmission member 26. The rotation of the second branch 42 about its pivot point 50 operates in its turn the first portion of the angle transmission and rotates the link rod 32 which then makes the ring 22 rotate in one direction or in the other about the axis X-X of the turbomachine. As indicated above, the rotation of the ring 22 causes a synchronized change of the angular position of the blades 14 of the stage 10 via the control levers 18.

When the cylinder 24 contracts, it pulls the yoke 126 and the rod 122 moves within the oblong holes 124 until it reaches the opposite end of the holes, as illustrated in FIG. 3. The bleed valves remain closed during this operation, under the action of the second return spring 112. The position represented in FIG. 3 is specific in that it corresponds to the precise moment at which the rod 122 secured to the control member 115 reaches abutment at the end of the hole 124, a position from which the yoke 126 begins to operate the control member 115 of the variable geometry 110. Conversely, from the beginning of the contraction of the cylinder 24, and up to this intermediate position, the control member 115 is not moved from its initial position (FIG. 2) despite the movement of the yoke 126. Also, the range of actuation of the cylinder 24, between its initial position (FIG. 2) and the specific intermediate position of FIG. 3, forms a free travel D for the second item of controlled equipment 110. During this movement, the blades of the stator close progressively while the bleed valves remain closed.

Conversely, from the specific position (or the beginning of actuation position) appearing in FIG. 3, any additional contraction of the cylinder 24 causes the yoke 126 to apply traction on the control member 115 and causes the latter to move. The positions of the cylinder 24 that are more contracted than in this position, form the range of actuation of the second equipment 110, during which the bleed valves open. With the rotation speed continuing to reduce, the cylinder is controlled to full retraction, which corresponds to the bleed valves being fully open (the position illustrated in FIG. 4).

The stator blades are, for their part, in the closed position from the position illustrated in FIG. 3 and remain so throughout the movement of the cylinder between the position of FIG. 3 and that of FIG. 4 because of the presence of the abutment 64.

In the direction of increase of the rotation speed N2 from the idle speed, the cylinder 24 extends, pushing the yoke 126 and allowing the rod 122 to accompany it under the action of the second return spring 112. In parallel, the bleed valves close. Once the bleed valves are completely closed, the cylinder can continue its journey and manage the opening of the stator blades, without interfering with the bleed valves thanks to the free travel D in which the rod 122 moves. For its part, the opening of the stator blades begins when the first return spring 61 is fully relaxed and the second branch 42 begins to separate the third branch 38 from the abutment 64.

Although the invention has been described with reference to several particular embodiments, it is quite clear that it is in no way limited thereto and that it includes all the technical equivalents of the means described and their combinations if the latter form part of the invention.

The invention claimed is:

1. A system for controlling at least two variable-geometry equipments of a turbomachine, the turbomachine comprising at least a first core rotating at a first speed and a second core rotating at a second speed, the first equipment comprising at least one variable pitch stator blade stage of a compressor of the first core moving between a closed position at idle speed and an open position at high speed, the second equipment comprising at least one compressor air bleed valve of the second core traveling between an open position at idle speed and a closed position at high speed, said system comprising:
   an actuator which actuates both equipments,
   wherein the actuator drives an angle-transmission member comprising at least two branches and mounted in a movable manner on the casing of the turbomachine, a first branch driving the first equipment and a second branch driving the second equipment.

2. The control system as claimed in claim 1, wherein the first core is a high-pressure core and the second core is a low-pressure core.

3. The control system as claimed in claim 1, wherein the actuator is controlled by the rotation speed of one of the turbomachine cores.

4. The control system as claimed in claim 2, wherein the actuator is controlled by the rotation speed of the high-pressure core.

5. The control system as claimed in claim 1, wherein the two branches are articulated and connected to one another via a first elastic return means.

6. The control system as claimed in claim 5, wherein the first branch is rotated on a portion of the travel of said actuator by said first elastic return means and remains at rest by contact with an abutment on the rest of its travel.

7. The control system as claimed in claim 5, wherein the actuator drives the second equipment via a sliding junction member arranging a free travel in the actuation of said second equipment.

8. The control system as claimed in claim 7, wherein the sliding junction member comprises a first control member supporting a rod that can move in an oblong hole made in a second control member.

9. The control system as claimed in claim 8, wherein the control member is returned by a second elastic means to the position corresponding to interaction between the first branch and an abutment.

10. The control system as claimed in claim 7, wherein the control member is returned by a second elastic means to the position corresponding to the absence of interaction between the first branch and an abutment.

11. The control system as claimed in claim 4, wherein the range of actuation of the second equipment is completely outside the range of operation of the first equipment.

12. A turbomachine comprising a control system as claimed in one of claim 1-4 or 5-11.

* * * * *